United States Patent [19]

Horikawa

[11] Patent Number: 4,734,783
[45] Date of Patent: Mar. 29, 1988

[54] SHADING ELIMINATION DEVICE FOR IMAGE READ-OUT APPARATUS

[75] Inventor: Kazuo Horikawa, Kaisei, Japan
[73] Assignee: Fuji Photo Film Co., Ltd., Japan
[21] Appl. No.: 899,156
[22] Filed: Aug. 22, 1986
[30] Foreign Application Priority Data Aug. 26, 1985 [JP] Japan ................................. 60-187041
Aug. 26, 1985 [JP] Japan ................................. 60-187042

[51] Int. Cl.⁴ ............................................. H04M 1/40
[52] U.S. Cl. .................................. 358/280; 358/282; 358/163
[58] Field of Search ............... 358/163, 256, 280, 282; 364/514

[56] References Cited

U.S. PATENT DOCUMENTS

4,523,229 6/1985 Kammioto ......................... 358/163
4,524,388 6/1986 Abe et al. ............................ 358/163
4,544,952 10/1986 Cang .................................... 358/163
4,633,314 12/1986 Furata et al. ....................... 358/163

Primary Examiner—Edward L. Coles, Sr.
Attorney, Agent, or Firm—Gerald J. Ferguson, Jr.; Michael P. Hoffman; Michael J. Foycik, Jr.

[57] ABSTRACT

A shading elimination device comprises a memory for storing characteristics of shading in an image read-out apparatus, a sensitivity adjuster for adjusting the sensitivity of a photodetector of the image read-out apparatus or an image density adjuster for adjusting the density of an image reproduced by an image reproducing apparatus, and a control circuit. The control circuit receives a signal representing the shading characteristics from the memory, and controls the sensitivity adjuster or the image density adjuster to eliminate changes in the output of the photodetector caused by shading in the image read-out apparatus.

12 Claims, 6 Drawing Figures

SHADING ELIMINATION DEVICE FOR IMAGE READ-OUT APPARATUS

BACKGROUND OF THE INVENTION

1. Field of the Invention

This invention relates to a device for compensation for changes in the output of a photodetector caused by intensity nonuniformity of a scanning light beam, scanning speed nonuniformity, light guiding nonuniformity of a light guiding optical system connected to the photodetector, sensitivity nonuniformity of the photodetector, or the like in an image read-out apparatus for scanning a recording medium carrying an image recorded thereon with the light beam and photoelectrically detecting light carrying the image information by the photodetector. This invention also relates to a device for compensation for the aforesaid changes in an image read-out and reproducing system comprising the aforesaid image read-out apparatus and an image reproducing apparatus for reproducing the image based on a read-out image signal generated by the image read-out apparatus.

2. Description of the Prior Art

Image read-out apparatuses for reading out an image by scanning a recording medium carrying the image recorded thereon with a light beam and detecting light reflected by the recording medium, light transmitting through the recording medium, or light emitted by the recording medium have heretofore been used, for example, as image input sections for computers and image read-out sections of facsimiles. In the image read-out apparatus of this type, the light beam emitted by a laser beam source or the like is deflected by a light deflector such as a galvanometer mirror to scan the recording medium, and light obtained by the recording medium and carrying the image information is detected by the photodetector. In general, in order to detect the light efficiently, a light guide member fabricated of a light guiding material is used, one end thereof is constituted as a light input end face, and the other end (light output end face) thereof is closely contacted with a photodetector such as a photomultiplier for detecting the light carrying the image information. A light guiding mirror may be positioned in the vicinity of the light input end face of the light guide member for reflecting light, which does not advance towards the light input end face, towards the light input end face, thereby improving the light guiding efficiency.

However, in the aforesaid image read-out apparatus, the output of the photodetector may change due to intensity nonuniformity caused by nonuniformity of the reflectivity of the reflecting surface of the light deflector, scanning speed nonuniformity of the light beam caused by fluctuations in the deflecting speed of the light deflector, or light guiding nonuniformity of the light guide member, i.e. nonuniformity of the light guiding efficiency, for example, at the end portion of the light guide member. In the case where the light guiding mirror is provided, reflecting and light guiding nonuniformity may also be caused by stains on the mirror or the like. Also, the photomultiplier or other photodetector may involve sensitivity nonuniformity wherein the sensitivity is different at different positions on the light receiving face. When regional deterioration of the light detecting efficiency (i.e. shading) is caused by the aforesaid nonuniformities, it becomes impossible to accurately detect the light obtained from the recording medium.

SUMMARY OF THE INVENTION

The primary object of the present invention is to provide a shading elimination device for an image read-out apparatus, which makes it possible to accurately detect light obtained from a recording medium even though shading arises.

Another object of the present invention is to provide a shading elimination device which eliminates shading in a plurality of image read-out apparatuses or which simultaneously eliminates shadings in an image read-out apparatus and an image reproducing apparatus, and which is inexpensive.

The present invention provides a shading elimination device for an image read-out apparatus for scanning a recording medium carrying an image recorded thereon with a light beam, obtaining light carrying image information, guiding the light by a light guiding optical system, and detecting the guided light by a photodetector connected with the light guiding optical system, the shading elimination device comprising:

(i) a storage means for storing characteristics of shading caused by intensity nonuniformity of said scanning light beam, scanning speed nonuniformity, light guiding nonuniformity of said light guiding optical system, sensitivity nonuniformity of said photodetector, or the like, (ii) a sensitivity adjustment means for adjusting the sensitivity of said photodetector, and (iii) a control circuit for receiving a signal representing said characteristics of shading from said storage means, and controlling said sensitivity adjustment means to eliminate a change in the output of said photodetector caused by said shading.

The present invention also provides a shading elimination device for an image read-out apparatus in an image read-out and reproducing system constituted by an image read-out apparatus for scanning a recording medium carrying an image recorded thereon with a light beam, obtaining light carrying image information, guiding the light by a light guiding optical system, and detecting the guided light by a photodetector connected with the light guiding optical system, and an image reproducing apparatus connected with the image read-out apparatus for reproducing the image based on a read-out image signal generated by the image read-out apparatus, the shading elimination device comprising:

(i) a storage means for storing characteristics of shading caused by intensity nonuniformity of said scanning light beam, scanning speed nonuniformity, light guiding nonuniformity of said light guiding optical system, sensitivity nonuniformity of said photodetector, or the like in said image read-out apparatus, (ii) an image density adjusting means for adjusting reproduced image density in said image reproducing apparatus, and (iii) a control circuit for receiving a signal representing said characteristics of shading from said storage means, and controlling said image density adjusting means to eliminate a change in the output of said photodetector caused by said shading in said image read-out apparatus.

With the shading elimination device for an image read-out apparatus in accordance with the present invention, it is possible to accurately read out light carrying image information through automatic compensation for shading, and to accurately reproduce the image recorded on the recording medium.

With the shading elimination device for an image read-out apparatus in an image read-out and reproducing system in accordance with the present invention, compensation for shading may be achieved by use of a single shading elimination device even though a plurality of the image read-out apparatuses are provided, or compensations for shadings in the image read-out apparatus and the image reproducing apparatus may be conducted by use of a single shading elimination device. Therefore, it becomes possible to conduct compensation for shading without making the image read-out and reproducing system expensive.

BRIEF DESCRIPTION OF THE DRAWINGS

FIGS. 1A-B are block diagrams showing the function of the correction value calculating circuit 26 and control circiut 30, respectively.

DESCRIPTION OF THE PREFERRED EMBODIMENTS

The present invention will hereinbelow be described in further detail with reference to the accompanying drawings.

Figure 1:
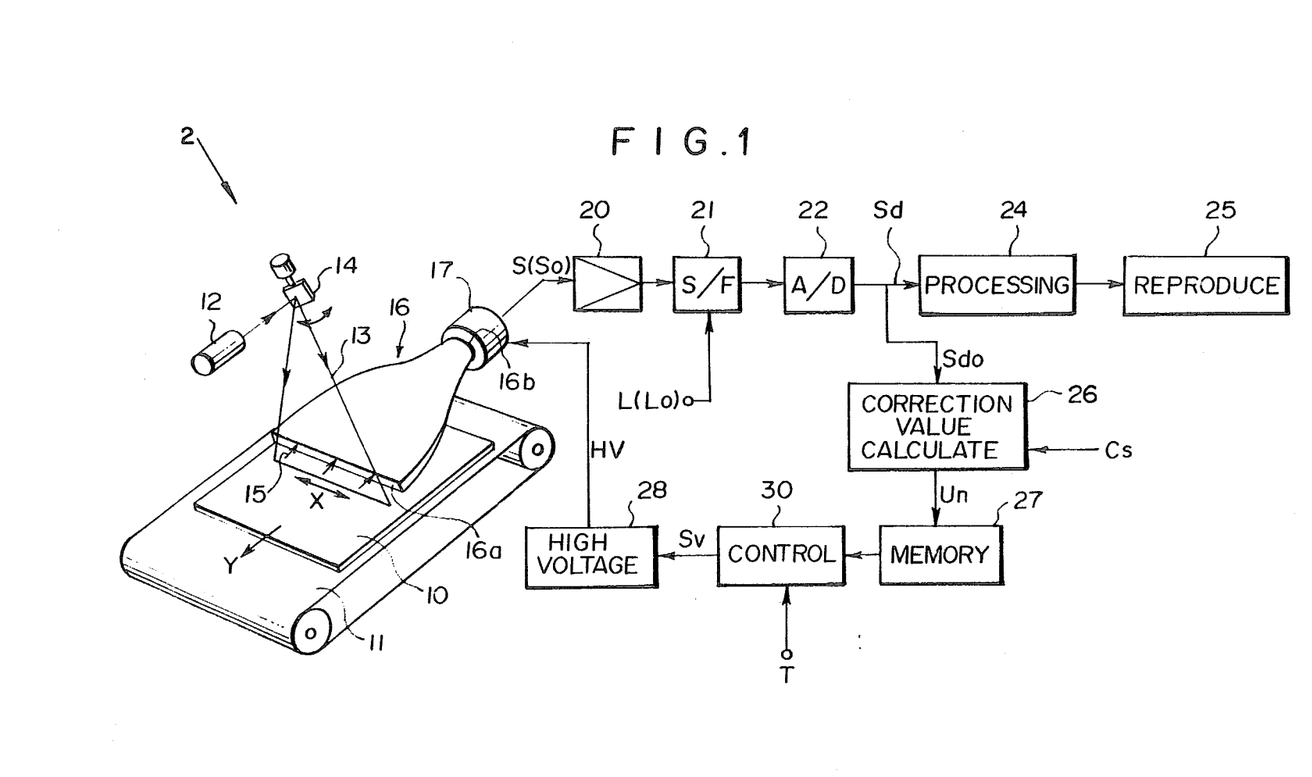
FIGS. 1A-B are schematic views showing the shading elimination device wherein compensation for shading is conducted by an embodiment of the shading elimination device for an image read-out apparatus in accordance with the present invention.

Referring to FIG. 1, there is shown, by way of example, an image read-out apparatus 2, which is identical to an image read-out apparatus 3 (not shown), constituted as a radiation image read-out apparatus for reading out light emitted by a stimulable phosphor sheet in proportion to radiation energy stored thereon in a radiation image recording and reproducing system using the stimulable phosphor sheet as disclosed, for example, in U.S. Pat. No. 4,258,264 and Japanese Unexamined Patent Publication No. 56(1981)-11395. A stimulable phosphor sheet 10 carrying a radiation image stored thereon is conveyed by a sheet conveyance means 11 constituted by an endless belt or the like in the sub-scanning direction as indicated by the arrow Y. Also, a laser beam 13 emitted as stimulating rays by a laser beam source 12 is deflected by a light deflector 14 constituted by a galvanometer mirror or the like so as to scan the stimulable phosphor sheet 10 in the main scanning direction as indicated by the arrow X approximately normal to the sub-scanning direction as indicated by the arrow Y. The portion of the stimulable phosphor sheet 10 exposed to the laser beam 13 emits light 15 in an amount proportional to the stored radiation energy. The emitted light 15 is guided by a light guide member 16 and photoelectrically detected by a photomultiplier 17 acting as a photodetector.

Figure 2:
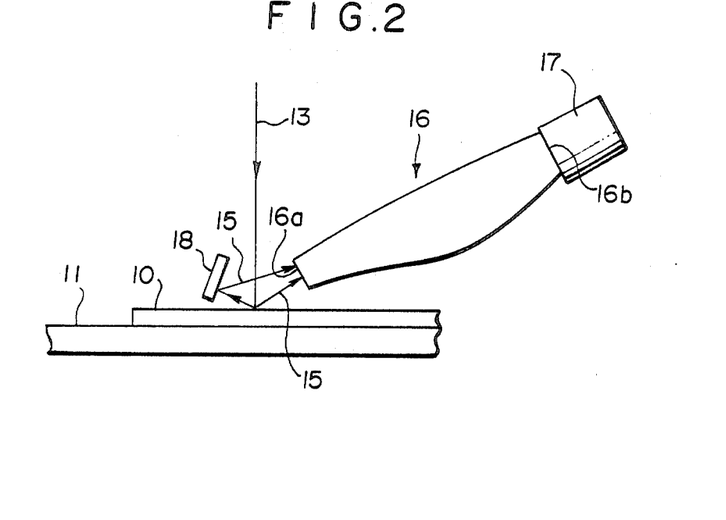
FIG. 2 is a side view showing a part of the image read-out apparatus of FIG. 1.

The light guide member 16 is fabricated by forming a light guiding material such as an acrylic resin sheet, and has a linear light input face 16a positioned to extend along the beam scanning line on the stimulable phosphor sheet 10, and a ring-shaped light output face 16b in close contact with a light receiving face of the photomultiplier 17. The light 15 emitted by the stimulable phosphor sheet 10 and entering the light guide member 16 from its light input face 16a is guided inside of the light guide member 16 through total reflection up to the light output face 16b, and received by the photomultiplier 17. Thus the amount of the light 15 carrying the image information is detected by the photomultiplier 17. The light guide member 16 may be of a shape and a material as disclosed in U.S. Pat. No. 4,346,295 and may be manufactured by use of a method disclosed therein. As shown in FIG. 2, a light guiding mirror 18 (not shown in FIG. 1) is positioned in the vicinity of the light input face 16a of the light guide member 16 in order to improve the light guiding efficiency. Therefore, the light 15 emitted by the stimulable phosphor sheet 10 towards the side opposite to the light input face 16a of the light guide member 16 is reflected by the light guiding mirror 18 to the light input face 16a, enters the light guide member 16 from the light input face 16a, and is detected by the photomultiplier 17.

As shown in FIG. 1, an analog output signal (read-out image signal) S generated by the photomultiplier 17 is amplified by a logarithmic amplifier 20. The scale factor (latitude) L is adjusted by a scale factor adjuster 21, and the read-out image signal S is digitized by an A/D converter 22. A digital read-out image signal Sd thus obtained is sent to an image processing circuit 24, subjected therein to a processing such as a gradation processing or frequency response processing, and then sent to an image reproducing apparatus 25 such as a cathode ray tube (CRT) or light scanning recording apparatus. The read-out image signal Sd represents the amount of light 15 emitted by the stimulable phosphor sheet 10. Therefore, when the read-out image signal Sd is used, the radiation image stored on the stimulable phosphor sheet 10 is reproduced as a visible image by the image reproducing apparatus 25. Instead of immediately entering the read-out image signal Sd to the image reproducing apparatus 25, the read-out image signal Sd may alternatively be temporarily recorded on a recording medium such as a magnetic disk or a magnetic tape.

In the aforesaid image read-out apparatus, intensity nonuniformity of the scanning light beam may be caused by reflectivity nonuniformity of the reflecting surface of the light deflector 14, and/or scanning speed nonuniformity may be caused by fluctuations in the deflecting speed of the light deflector 14. Also, light guiding nonuniformity may arise with the light guide member 16 since it is formed in a complicated shape. Further, at the light guiding mirror 18, reflection nonuniformity may be caused by stains thereon. On the other hand, the photomultiplier 17 may involve sensitivity nonuniformity. When shading is generated by such nonuniformities, the level of the output signal S of the photomultiplier 17 changes between different beam scanning positions even though the amount of the light 15 emitted by the stimulable phosphor sheet 10 is the same. Thus shading arises because it becomes impossible to accurately detect the light 15 emitted by the stimulable phosphor sheet 10. Elimination of shading will now be described in detail below.

Figure 3:
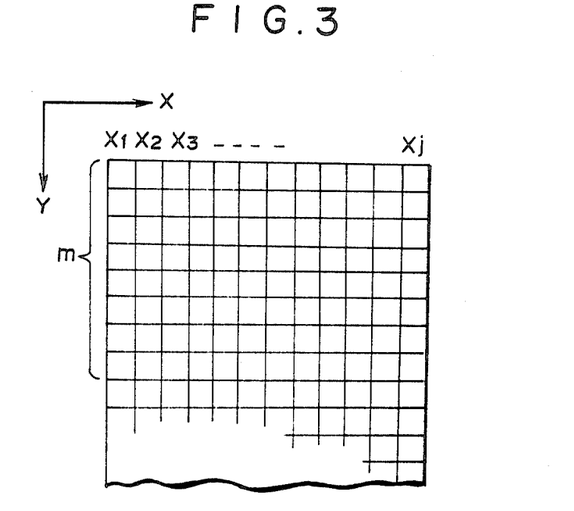
FIG. 3 is an explanatory view showing compensation for shading conducted by the shading elimination device for an image read-out apparatus in accordance with the present invention.

Before the radiation image read-out is conducted as described above, the stimulable phosphor sheet 10 is exposed to a radiation such as X-rays of uniform intensity. A stimulable phosphor sheet 10 is first uniformly exposed to such radiation over its whole surface, for use as a reference sheet for supplying a uniform light source for the image read-out apparatus 2. Then, image read-out is conducted in the same manner as described above, by scanning of the uniformly-exposed sheet by the laser beam source 12. The stimulable phosphor sheet 10 scanned by the laser beam 13 emits light 15, and the emitted light 15 is detected by the photomultiplier 17 via the light guide member 16. A reference output signal So generated by the photomultiplier 17 at this time is amplified by the logarithmic amplifier 20 in the same manner as described above. The scale factor Lo is adjusted by the scale factor adjuster 21, and the reference output signal So is digitized by the A/D converter 22. The digital reference output signal Sdo thus obtained is sent to a correction value calculating circuit 26, which receives an initaiting signal, namely a correction value calculation signal Cs, sent by a controller (not shown) which initiates calculation of the difference in the level of the reference output signal Sdo at respective picture elements in the direction along the light input face 16a. (This difference is caused by shading, and represents the shading characteristics.) Specifically, as shown in FIG. 3, when j columns of picture elements are arrayed like X1, X2, X3, . . . , Xj in the main scanning direction X, an average value of the reference output signals Sdo, Sdo, . . . at m number of picture elements in the n'th column is calculated as a representative signal value Rn of the n'th column. The correction value calculating circuit 26 calculates the difference Un=Rn-Ro between the respective representative signal values Rn and an average value Ro of representative signal values R1, R2, . . . , Rj in all of the first column to the j'th column. Values U1, U2, . . . , Uj thus obtained are stored in a memory 27 as the correction values at the scale factor Lo. On the other hand, a high voltage source 28 for applying a high voltage HV to the photomultiplier 17 is constituted so that the output voltage of the high voltage source 28 is changed in accordance with a voltage control signal Sv generated by a control circuit 30.

When the radiation image stored on the stimulable phosphor sheet 10 is read out as described above, the control circuit 30 reads the correction values U1, U2, . . . , Uj from the memory 27, and generates the control signal Sv corresponding to each of the correction values U1, U2, . . . , Uj. Specifically, when the output voltage of the high voltage source 28 is changed and the high voltage HV applied to the photomultiplier 17 is changed, the sensitivity of the photomultiplier 17 changes, and as a result the level of the read-out image signal S changes. The control circuit 30 changes the control signal Sv so that the sensitivity of the photomultiplier 17 is decreased as the correction values U1, U2, . . . , Uj become large, and the same level of the read-out image signal S is obtained from the same intensity of the emitted light 15. At this time, the control circuit 30 outputs the control signal Sv corresponding to the correction value Un for the n'th column on the basis of a synchronizing signal T synchronous with the scanning of the laser beam 13 when the picture elements in the n'th column are read out.

When control is effected as described above, it is possible to compensate for changes in the output of the photomultiplier 17 caused by shading, and to detect the emitted light 15 accurately. Thus it becomes possible to accurately reproduce the radiation image stored on the stimulable phosphor sheet 10.

In the case where the high voltage HV applied to the photomultiplier 17 is changed, the correction values U1, U2, . . . , Uj at respective high voltages HV within the use range may be calculated and stored in the memory 27. In this case, the correction value is read from the memory 27 in accordance with the high voltage HV adjusted at the time of image read-out and used for shading elimination. In the case where the high voltage HV applied to the photomultiplier 17 is changed infinitely or in very small increments, several sets of the correction values U1, U2, . . . , Uj at several levels of the high voltages close to the adjusted high voltage HV may be read from the memory 27, and interpolated by a known interpolation method, thereby to calculate the correction value corresponding to the adjusted high voltage HV. In this case, it becomes possible to decrease the number of the correction values stored in the memory 27. Also, in order to decrease the number of the correction values stored in the memory 27, it is possible to calculate only the correction values for alternating picture element columns, for example, for odd-numbered picture element columns, among j columns of picture elements from X1 to Xj, and to store the correction values in the memory 27. Correction values for the picture element columns between said alternating picture element columns may be calculated by interpolation of the correction values read from the memory 27.

In the case where it is difficult to accurately calculate the correction values U1, U2, . . . , Uj from the reference output signal So due to adverse effects of noise or the like, the correction values U1, U2, . . . , Uj may be calculated from a signal obtained by smoothing the reference output signal So.

In the aforesaid embodiment, the light 15 emitted by the stimulable phosphor sheet 10 uniformly exposed to a radiation such as X-rays over the whole surface is utilized as the reference light received by the photomultiplier 17 for calculating the correction values. However, the reference light for calculation of the correction values is not limited to said light 15. For example, a stimulable phosphor sheet formed in the same size as the stimulable phosphor sheet 10 and capable of storing visible light energy may be uniformly exposed to visible light, and may then be exposed to the laser beam 13. Light emitted by the stimulable phosphor sheet at this time may be utilized as the reference light. This method is advantageous since an erasing light source which emits visible light as erasing light and which is normally built in the image read-out apparatus for releasing energy remaining on the stimulable phosphor sheet after the image read-out can be utilized for calculation of the correction values.

The correction values stored in the memory 27 may also be calculated without utilizing the aforesaid reference light. Specifically, in the case where nonuniformity characteristics such as the light guiding nonuniformity characteristics of the light guide member 16 and sensitivity nonuniformity characteristics of the photomultiplier 17 are known respectively as individual characteristics, the correction values may be decided in accordance with the respective characteristics. However, the correction value calculating circuit 26 should preferably be provided as in the aforesaid embodiment since it becomes possible to calculate the correction values when necessary after the operation of the image read-out apparatus is started, and thus to cope with changes in the shading characteristics with time.

The photodetector is not limited to the photomultiplier 17, and may be constituted by any other means, for example, by a photoelectric conversion element array. Also, as the means for adjusting the sensitivity of the photodetector is not limited to a means for varying the output voltage of the high voltage source 28 of the photomultiplier 17 and may, for example, be a means for changing the feedback resistance of the amplifier for amplifying the output of the photodetector in case where the amplifier is a linear amplifier.

Further, the light guiding optical system is not limited to the one constituted by the light guide member 16 and the light guiding mirror 18. Thus the shading elimination device of the present invention is applicable to elimination of shading as a whole, including the light guiding optical system and the photodetector, even though some other light guiding optical system is used.

Figure 4:
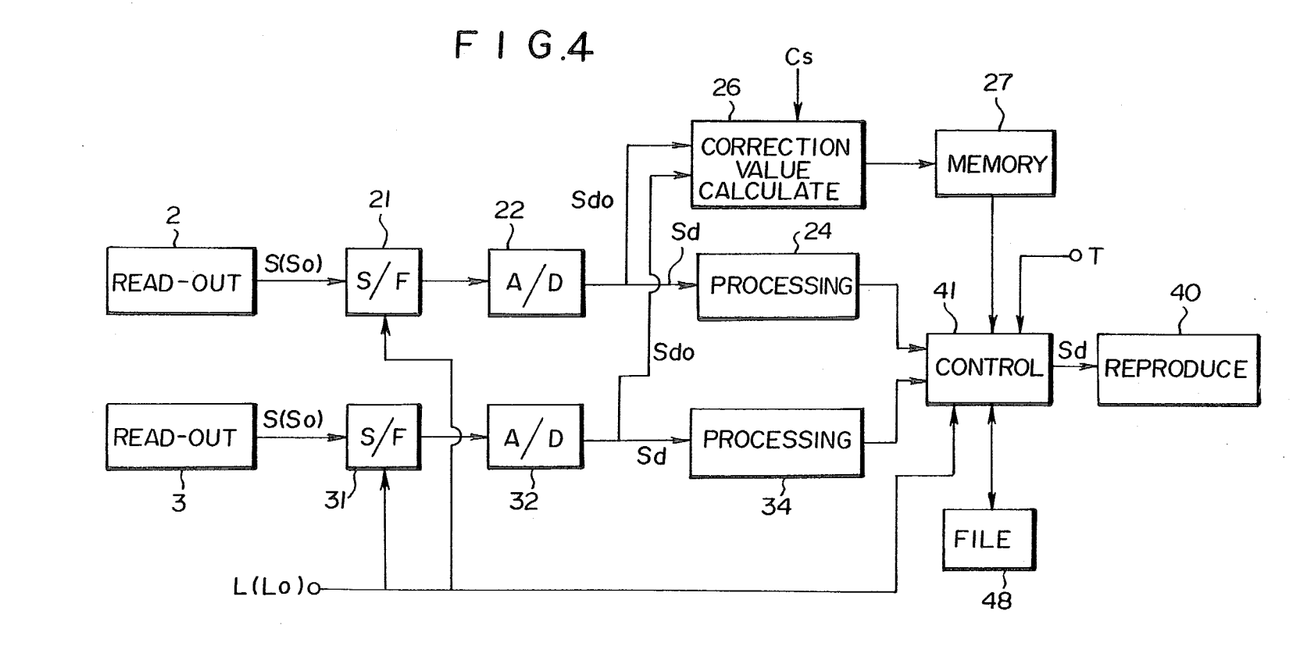
FIG. 4 is a block diagram showing the image read-out and reproducing system wherein compensation for shading is conducted by an embodiment of the shading elimination device for an image read-out apparatus in an image read-out and reproducing system in accordance with the present invention.
Figure 5:
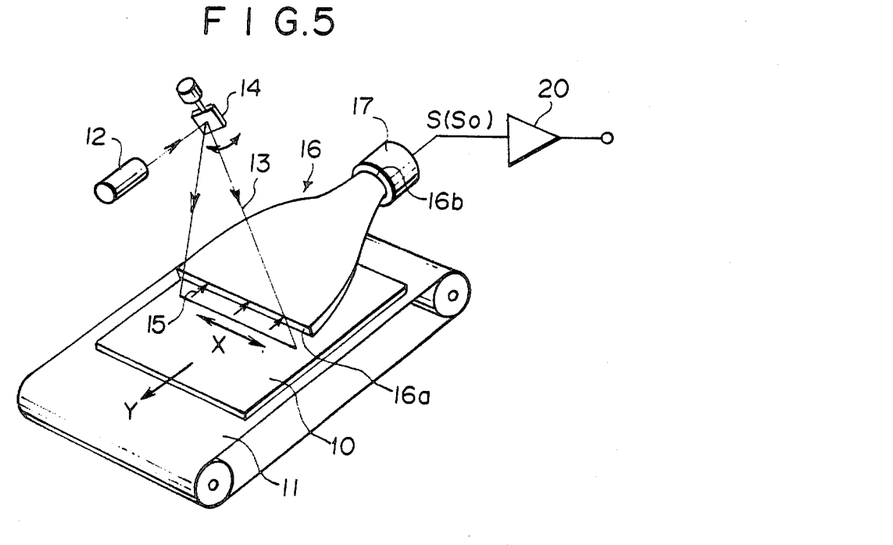
FIG. 5 is a schematic perspective view showing the image read-out apparatus in the image read-out and reproducing system of FIG. 4.
Figure 6:
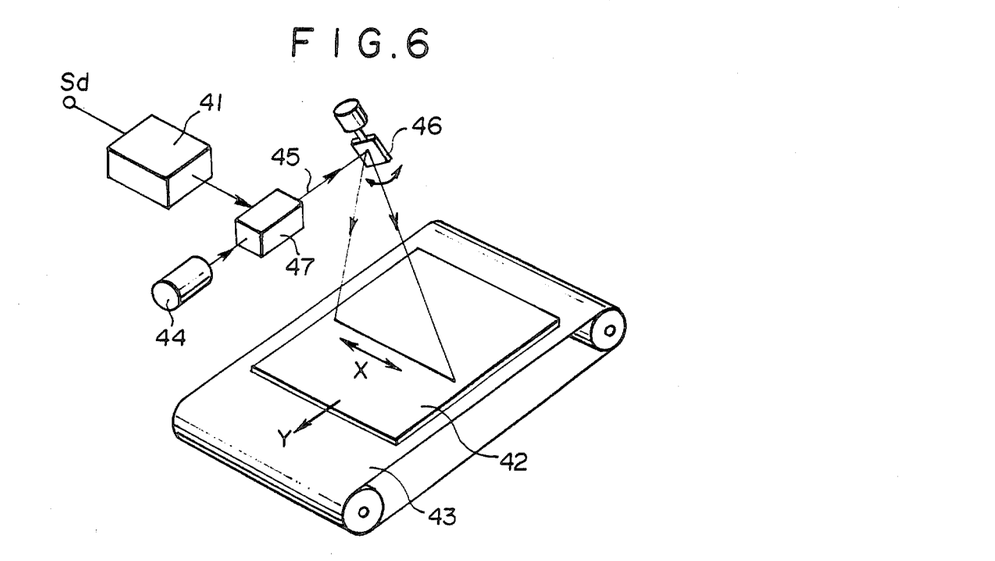
FIG. 6 is a schematic perspective view showing the image reproducing apparatus in the image read-out and reproducing system of FIG. 4.

FIGS. 4, 5 and 6 show an image read-out and reproducing system provided with an embodiment of the shading elimination device for an image read-out apparatus in an image read-out and reproducing system in accordance with the present invention. In FIGS. 4 and 5, similar elements are numbered with the same reference numerals with respect to FIG. 1. As shown in FIG. 4, by way of example, image read-out apparatuses 2 and 3 are provided in this embodiment, and image signals detected by the image read-out apparatuses 2 and 3 are used to reproduce visible images by a common image reproducing apparatus 40. The image read-out apparatuses 2 and 3 are constituted as shown in FIG. 5.

In the image read-out apparatus 2, image read-out is conducted in the same manner as described with reference to FIG. 1. As shown in FIG. 4, the digital read-out image signal Sd processed by the image processing circuit 24 as described above is sent to a control circuit 41.

Also, in the image read-out apparatus 3, the radiation image stored on the stimulable phosphor sheet 10 is read out in the same manner as described above. As shown in FIG. 4, the read-out image signal S generated by the image read-out apparatus 3 is sent through a scale factor adjuster 31 and an A/D converter 32 which are respectively constituted in the same manner as the scale factor adjuster 21 and the A/D converter 22. The digital read-out image signal Sd generated by the A/D converter 32 is sent to an image processing circuit 34 which conducts an image processing of the digital read-out image signal Sd, and the signal Sd thus processed is sent to the control circuit 41.

Based on the read-out image signal Sd sent from the control circuit 41, the image reproducing apparatus 40 reproduces the radiation image stored on the stimulable phosphor sheet 10. In this embodiment, by way of example, the image reproducing apparatus 40 is constituted as a light scanning recording apparatus as shown in FIG. 6. In the apparatus of FIG. 6, a photosensitive material 42 is conveyed in the sub-scanning direction as indicated by the arrow Y by a conveyance means 43 such as an endless belt. At the same time, a laser beam 45 emitted by a laser beam source 44 is deflected by a light deflector 46 to scan the photosensitive material 42 in the main scanning direction as indicated by the arrow X normal to the sub-scanning direction. As a result, the photosensitive material 42 is two-dimensionally scanned by the laser beam 45. When the laser beam 45 is modulated by a light modulator 47 constituted by an AOM (acousto-optic modulator) or the like on the basis of the read-out image signal Sd sent from the control circuit 41, the image information represented by the image signal Sd, i.e. the image stored on the stimulable phosphor sheet 10, is recorded on the photosensitive material 42.

In the case where the control circuit 41 receives the read-out image signal Sd sent from the image read-out apparatus 3 (or 2) while radiation image reproducing is being carried out based on the read-out image signal Sd sent from the other image read-out apparatus 2 (or 3), the control circuit 41 temporarily stores the read-out image signal Sd received later in an image file 48 constituted by a magnetic disk, an optical disk or the like. When the radiation image reproducing based on the previous read-out image signal Sd is completed, the control circuit 41 reads the stored read-out image signal Sd from the image file 48, and sends it to the image reproducing apparatus 40.

In the embodiment of FIG. 4, in order to eliminate shading, the stimulable phosphor sheet 10 is uniformly exposed to a radiation over the whole surface before the radiation image read-out is conducted at the image read-out apparatus 2. The correction values U1, U2, ..., Uj obtained by the correction value calculating circuit 26 in the same manner as described with reference to FIGS. 1 and 3 are stored at a specific area in the memory 27 as the correction values at the scale factor Lo for the image read-out apparatus 2. Also, on the side of the image read-out apparatus 3, the correction values U1, U2, ..., Uj at the scale factor Lo for the image read-out apparatus 3 are obtained in the same manner as described above, and stored at an area of the memory 27 different from the area where the correction values for the image read-out apparatus 2 are stored.

When the radiation image stored on the stimulable phosphor sheet 10 is read out by the image read-out apparatus 2, the control circuit 41 reads the correction values U1, U2, ..., Uj for the image read-out apparatus 2 from the memory 27, and subtracts the correction values U1, U2, ..., Uj from the read-out image signal Sd. At this time, timing of reading of the correction values U1, U2, ..., Uj by the control circuit 41 is controlled by use of the synchronizing signal T in synchronization with the operation of the light deflector 46 so that the correction value Un is subtracted from the read-out image signal Sd at the picture elements of the n'th column. Also, at this time, the control circuit 41 discriminates that the read-out signal subjected to the image reproducing is of the image read-out apparatus 2 based on an operation signal of the image read-out apparatus 2, a read-out apparatus identification signal added to the beginning of the read-out image signal S, or the like, and reads the correction values U1, U2, ..., Uj for the image read-out apparatus 2 from the memory 27. In order to make the control circuit 41 discriminate between the image reproducing of the read-out signal generated by the image read-out apparatus 2 and the image reproducing of the read-out signal generated by the image read-out apparatus 3, an identification signal may also be manually entered to the control circuit 41.

When correction is conducted for the read-out image signal Sd by subtraction of the correction value Un, changes in the output of the photomultiplier 17 caused by shading are compensated for, and it becomes possible to accurately reproduce the radiation image stored on the stimulable phosphor sheet 10. Also when reproducing of the radiation image is conducted based on the read-out image signal Sd obtained by the image read-out apparatus 3, compensation for shading is carried out in the same manner based on the correction values U1, U2, ..., Uj for the image read-out apparatus 3 which are stored in the memory 27.

In the case where the scale factor L for the read-out image signal S in the radiation image read-out is different from the scale factor Lo for the reference output signal So for obtaining the correction values U1, U2, ..., Uj, the values L and Lo are entered to the control circuit 41. In order to compensate for the difference between these scale factors, the control circuit 41 conducts the aforesaid compensation for shading based on values obtained by multiplying the correction values U1, U2, ..., Uj by L/Lo.

At the image reproducing apparatus 40, instead of modulating the laser beam 45 based on the read-out image signal Sd, the laser beam source 44 may be directly modulated with the read-out image signal Sd. In this case, too, the same effects as described above are obtained by conducting the aforesaid shading elimination (compensation) processing. It is also possible to position a light modulator for shading elimination in the optical path of the laser beam 45 in addition to the light modulator 47, and to compensate for shading by modulating the laser beam 45 with the additional light modulator based on the correction values U1, U2, ..., Uj.

The image reproducing apparatus 40 is not limited to the light scanning recording apparatus as shown in FIG. 3, may be a CRT display device or the like. When the CRT display device or the like is used, luminance modulation may be conducted based on the correction values U1, U2, ..., Uj for shading elimination.

When the light scanning recording apparatus, the CRT display device, or the like is used as the image reproducing apparatus, shading arises also with the image reproducing apparatus. Therefore, values obtained by adding correction values for compensation for shading of the image reproducing apparatus to the aforesaid correction values U1, U2, ..., Uj should be used as the correction values. In this case, it becomes possible to simultaneously compensate for shadings of the image read-out apparatus and the image reproducing apparatus.

The number of the image read-out apparatuses is not limited to two, and the shading elimination device for an image read-out and reproducing system in accordance with the present invention is applicable also to an image read-out and reproducing system comprising one or more image read-out apparatuses, or three or more image read-out apparatuses, and a single common image reproducing apparatus.

The shading elimination device in accordance with the present invention is applicable not only to the image read-out apparatus for detecting light emitted by the stimulable phosphor sheet 10 but also to any other image read-out apparatus for detecting light reflected by a recording medium, light transmitting through a recording medium, or the like, which carries image information.

I claim:

1. A shading elimination device for an image read-out apparatus for scanning a recording medium carrying an image recorded thereon with a light beam, obtaining light carrying image information, guiding the light by a light guiding optical system, and detecting the guided light by a photodetector connected with the light guiding optical system,
the shading elimination device comprising:
   (i) a storage means for storing characteristics of shading caused by intensity nonuniformity of said scanning light beam, scanning speed nonuniformity, light guiding nonuniformity of said light guiding optical system, sensitivity nonuniformity of said photodetector, or the like,
   (ii) a sensitivity adjustment means for adjusting the sensitivity of said photodetector, and
   (iii) a control circuit for receiving a signal representing said characteristics of shading from said storage means, and controlling said sensitivity adjustment means to eliminate a change in the output of said photodetector caused by said shading.

2. A shading elimination device as defined in claim 1 further comprising a correction value calculating means for investigating said characteristics of shading and calculating correction values for eliminating a change in the output of said photodetector caused by said shading.

3. A shading elimination device as defined in claim 1 wherein said control circuit controls said sensitivity adjustment means based on a synchronizing signal in synchronization with said scanning of said recording medium with said light beam.

4. A shading elimination device as defined in claim 1 wherein said photodetector is a photomultiplier, and said sensitivity adjustment means is a high voltage source constituted to change the output voltage thereof supplied to said photomultiplier in accordance with a voltage control signal generated by said control circuit.

5. A shading elimination device as defined in claim 1 wherein said recording medium is a stimulable phosphor sheet, and said image is a radiation image.

6. A shading elimination device as defined in claim 1 wherein said light beam is a laser beam.

7. A shading elimination device for an image read-out apparatus in an image read-out and reproducing system constituted by an image read-out apparatus for scanning a recording medium carrying an image recorded thereon with a light beam, obtaining light carrying image information, guiding the light by a light guiding optical system, and detecting the guided light by a photodetector connected with the light guiding optical system, and an image reproducing apparatus connected with the image read-out apparatus for reproducing the image based on a read-out image signal generated by the image read-out apparatus,
the shading elimination device comprising:
   (i) a storage means for storing characteristics of shading caused by intensity nonuniformity of said scanning light beam, scanning speed nonuniformity, light guiding nonuniformity of said light guiding optical system, sensitivity nonuniformity of said photodetector, or the like in said image read-out apparatus,
   (ii) an image density adjusting means for adjusting reproduced image density in said image reproducing apparatus, and
   (iii) a control circuit for receiving a signal representing said characteristics of shading from said storage means, and controlling said image density adjusting means to eliminate a change in the output of said photodetector caused by said shading in said image read-out apparatus.

8. A shading elimination device as defined in claim 7 further comprising a correction value calculating means for investigating said characteristics of shading and calculating correction values for eliminating a change in the output of said photodetector caused by said shading in said image read-out apparatus.

9. A shading elimination device as defined in claim 7 wherein said image density adjusting means is a means for modulating light for image reproduction.

10. A shading elimination device as defined in claim 7 wherein said image read-out and reproducing system is constituted by a plurality of said image read-out apparatuses and a single common image reproducing apparatus.

11. A shading elimination device as defined in claim 7 wherein said recording medium is a stimulable phosphor sheet, and said image is a radiation image.

12. A shading elimination device as defined in claim 7 wherein said light beam is a laser beam.

* * * * *